(12) United States Patent
Garg et al.

(10) Patent No.: US 7,711,815 B2
(45) Date of Patent: May 4, 2010

(54) USER ACTIVITY DETECTION ON A DEVICE

(75) Inventors: Neeraj K. Garg, Hyderabad (IN);
Niranjan S. Nayak, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 11/548,143

(22) Filed: Oct. 10, 2006

(65) Prior Publication Data
US 2008/0086528 A1   Apr. 10, 2008

(51) Int. Cl.
*G06F 15/16* (2006.01)
(52) U.S. Cl. ..................................... 709/224
(58) Field of Classification Search ................. 709/206, 709/224
See application file for complete search history.

(56) References Cited

U.S. PATENT DOCUMENTS

| | | | |
|---|---|---|---|
| 6,757,722 | B2 | 6/2004 | Lonnfors et al. |
| 7,020,480 | B2 | 3/2006 | Coskun et al. |
| 7,095,400 | B2 * | 8/2006 | Ho et al. ..................... 345/102 |
| 7,283,805 | B2 * | 10/2007 | Agrawal .................. 455/412.2 |
| 7,298,714 | B2 * | 11/2007 | Foster ........................ 370/315 |
| 2002/0035605 | A1 | 3/2002 | McDowell et al. |
| 2003/0014491 | A1 | 1/2003 | Horvitz et al. |
| 2004/0010808 | A1 | 1/2004 | deCarmo |
| 2004/0250212 | A1 | 12/2004 | Fish |
| 2005/0068166 | A1 | 3/2005 | Baker |
| 2005/0114159 | A1 | 5/2005 | Ozugur et al. |
| 2005/0228882 | A1 * | 10/2005 | Watanabe et al. ............ 709/224 |
| 2005/0232184 | A1 | 10/2005 | Borella et al. |
| 2006/0165064 | A1 | 7/2006 | Brown et al. |
| 2006/0165149 | A1 * | 7/2006 | Kolk .............................. 374/1 |
| 2006/0223593 | A1 * | 10/2006 | Ishak .......................... 455/574 |
| 2006/0259632 | A1 * | 11/2006 | Crawford et al. ............ 709/229 |

(Continued)

FOREIGN PATENT DOCUMENTS

WO   WO2004057888 A1   7/2004

OTHER PUBLICATIONS

J, Jachner, et al. Rich Presence: A New User Communications Experience, Alcatel Telecommunications Review—1st Quarter 2005, www.alcatel.com/doctypes/articlepaperlibrary/pdf/ATR2005Q1/T0503-Rich_presence-EN.pdf, last accessed Oct. 10, 2006, 8 pages.

(Continued)

*Primary Examiner*—Quang N. Nguyen
*Assistant Examiner*—Tesfay Yohannes
(74) *Attorney, Agent, or Firm*—Turocy & Watson, LLP (57) ABSTRACT

Communication information is sent to a device that a user is using rather than a device the user is not using. For example, a backlight of a device can be monitored and if the backlight becomes inactive (turns off) for longer than a predetermined interval, it can be inferred that the user is no longer using the device and communications are no longer sent to the device. If the backlight becomes active (turns on) for longer than a predefined interval it is inferred that the user is active on the device and communications are sent to the device. If intrinsic evidence is of a high confidence level that the user is using the device, such as answering a phone call or sending a communication, the device is declared active without waiting for expiration of the confirmation timer.

16 Claims, 9 Drawing Sheets

U.S. PATENT DOCUMENTS

2007/0021065 A1* 1/2007 Sengupta et al. ............ 455/41.2
2007/0274286 A1* 11/2007 Krishnan ..................... 370/351
2008/0008313 A1* 1/2008 Fyke ..................... 379/433.01

OTHER PUBLICATIONS

Abderrahmane Lakas, et al. A Framework for SIP-Based Wireless Medical Applications, IEEE 2005, http://ieeexplore.ieee.org/iel5/10360/32962/01543848.pdf?isNumber=, last accessed Aug. 30th, 2006, 5 pages.

Wei Li, Toward a Person-Centric Context Aware System, Advances in Pervasive Computing 2006, http://www.pervasive2006.org/ap/pervasive2006_adjunct_4F.pdf#search=%22SIP%20client%20mobile%20device%20publish%20user%20using%20device%22, last accessed Oct. 10, 2006. 6 pages.

* cited by examiner

USER ACTIVITY DETECTION ON A DEVICE

BACKGROUND

Computing devices are commonly utilized by users to communicate almost instantaneously with one or more contacts. Such information exchange can occur by a user entering information (e.g., text, visual, audio, and so on) into a display area of a user device and communicating with the one or more contacts in a back-and-forth manner without using a telephone or other method of communication. This almost instantaneous communication allows a user and various contacts in disparate locations to communicate in a real time fashion.

In various situations, a user may wish to monitor the presence and availability of various contacts (through respective computing devices). However, some users may utilize multiple devices (e.g., desktop, web client, mobile client, and the like), which can make it difficult to determine the device that the user is currently operating and the device to which communication should be sent. Some of the devices in use might not have a platform support, which an application can leverage in order to determine the user's activity of the device. If the user is not active on a particular device and communications are being sent to that device, the user may miss important communications because such user might be utilizing a different device.

Therefore, what is needed is discovery of whether a user of a particular device is actively using the device and if so, communications are sent to that device. Such discovery can mitigate the occurrence of a user receiving a communication (e.g., real-time message) at a device which the user is not currently utilizing and potentially miss an important communication.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The user of a device (either one device or multiple devices) can register the device with a Session Initiation Protocol (SIP) presence agent and monitor for the presence of one or more contacts. If the user is actively utilizing a device (e.g., "Online"), the device's presence or status is set to "Active". If the user is not actively utilizing a device (e.g., Away), the device's presence or status is set to "Away". Thus, in order to facilitate monitoring of the presence and availability of various contacts, the actual state of the device ("Active" or "Away") should be detected and communicated to the presence agent.

An activity monitor component can monitor the state of the mobile device's display screen. If the user is not actively utilizing the device (e.g., there is inactivity), a backlight can be turned off, such as when the device is idle for longer than a predetermined interval, which can be determined based on one or more device settings. Having the backlight off indicates that the user is not using the device and the device status should be set to "Away". The backlight can be turned back on (and the device returned to "Active" status) when activity on the device is detected and/or expiration of a confirmation timer. In such a manner, the actual presence of the user can be conveyed to others who are monitoring such user's presence and availability in order to communicate in a real-time manner.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

The various embodiments disclosed herein can be performed on electrical devices (referred to herein as user device or simply device) including devices that utilize touch screen display technologies and/or mouse-and-keyboard type interfaces. Examples of such devices include computers (desktop and mobile), smart phones, personal digital assistants (PDAs), data terminals and other electronic devices both wired and wireless.

Figure 1:
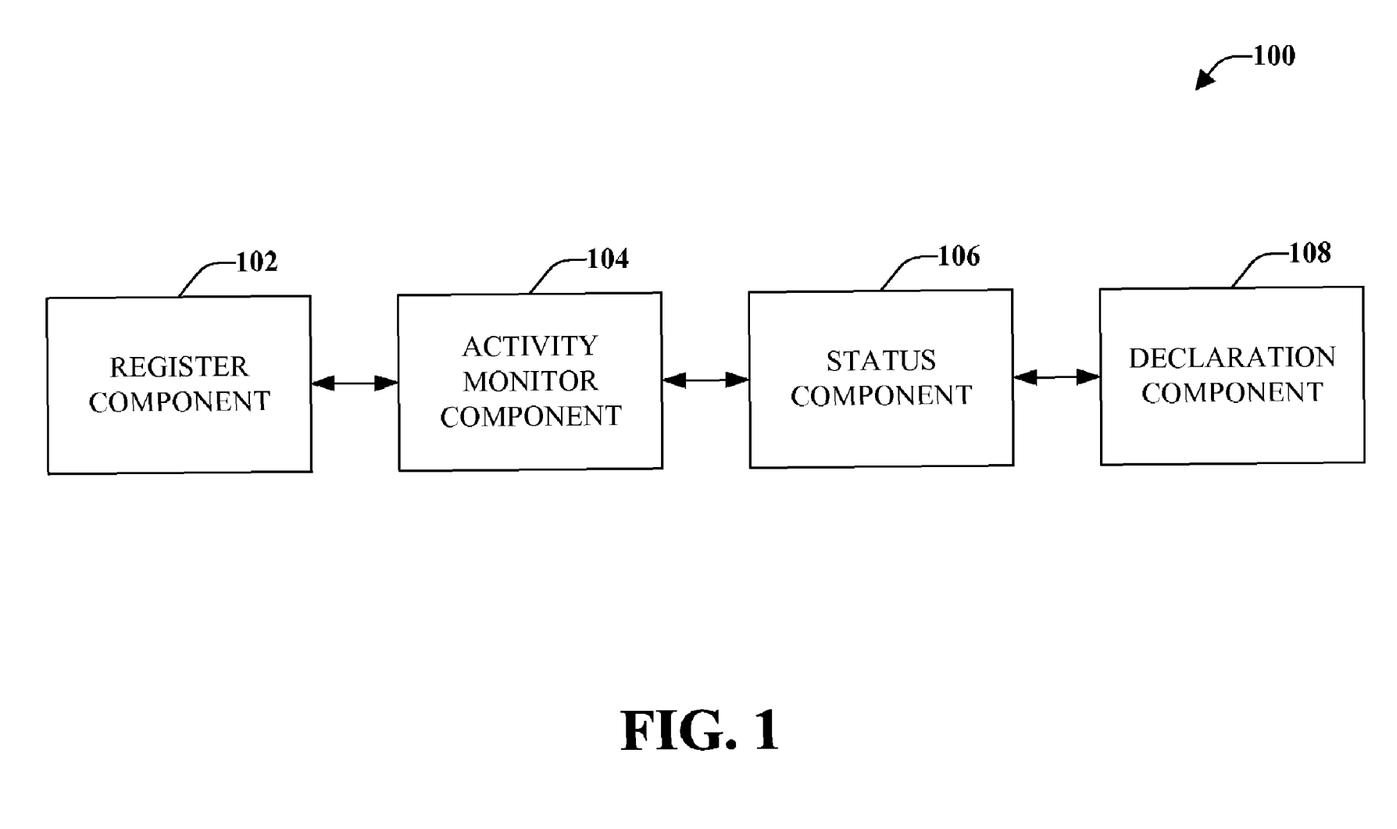
FIG. 1 illustrates a system for detecting device activity.

Referring initially to FIG. 1, illustrated is a system 100 for detecting device activity to facilitate presence detection and communication for a real-time messaging application or other application. System 100 includes a register component 102 that can be configured to register a user device to detect the presence of one or more on-line contacts (e.g., other users, co-workers, friends, business associates, family members). Also included in system 100 is an activity monitor component 104 that can be configured to monitor activity of the device (e.g., whether a user is utilizing one or more applications on the device). The activity of the device is communicated to a status component 106 that can set the status of the device to "Active" or "Away" and a declaration component 108 that can be configured to declare the device as "Active" (e.g., in use) or "Away" (e.g., not being used).

Specifically, register component 102 can allow a user to register a device enabling such user to monitor the status of one or more contacts and receive or request status updates, which provides both the user and the contact(s) a means to communicate (e.g., text, audio, audible, and the like) in a real-time fashion. The status of the contact(s) can include such information as "on-line", "off-line", "busy", "away", "out to lunch", "in a meeting", "on the phone", "will be back in "xx" minutes", and so on. The contact(s) can likewise view the status of the user, thus enabling real-time communication when both participants are available.

However, there may be times when a user is utilizing multiple devices (e.g., desktop computer, web user, mobile user) at substantially the same time. The incoming real-time messages and voice calls can be presented to the user based on user's most active end-point. Thus, it is beneficial for each end-point to recognize when the user is active on that particular device. This can be detected by activity monitor component 104 that can monitor a device backlight state (e.g., on, off). An "off" state of the backlight 218 can indicate that user is not using the device (Away). An "on" state of the backlight 218 can indicate that the user is actively using the device (Online). In some embodiments, activity monitor component 104 sets the device status to Away based on a manual instruction, such as by a user turning the device off or manually placing the device in an Away state. Alternatively or in addition, activity monitor component 104 can detect activities or intrinsic evidence such as an incoming phone call being answered on the device, an outgoing phone call being made, and the like, that indicates a user is currently using the device and thus, the device status should be set to "Active".

Activity status monitor 104 conveys the status of the device to status component 106 that can set the device to the particular status as determined by activity status monitor 104. The status set by status component 106 can stay in effect until a different status is detected by activity monitor component 104 and declared as the status of the device by declaration component 108. In such a manner, a user can utilize multiple devices and receive real-time messages and other data on the device that the user is currently operating and monitoring rather than on a different device.

Figure 2:
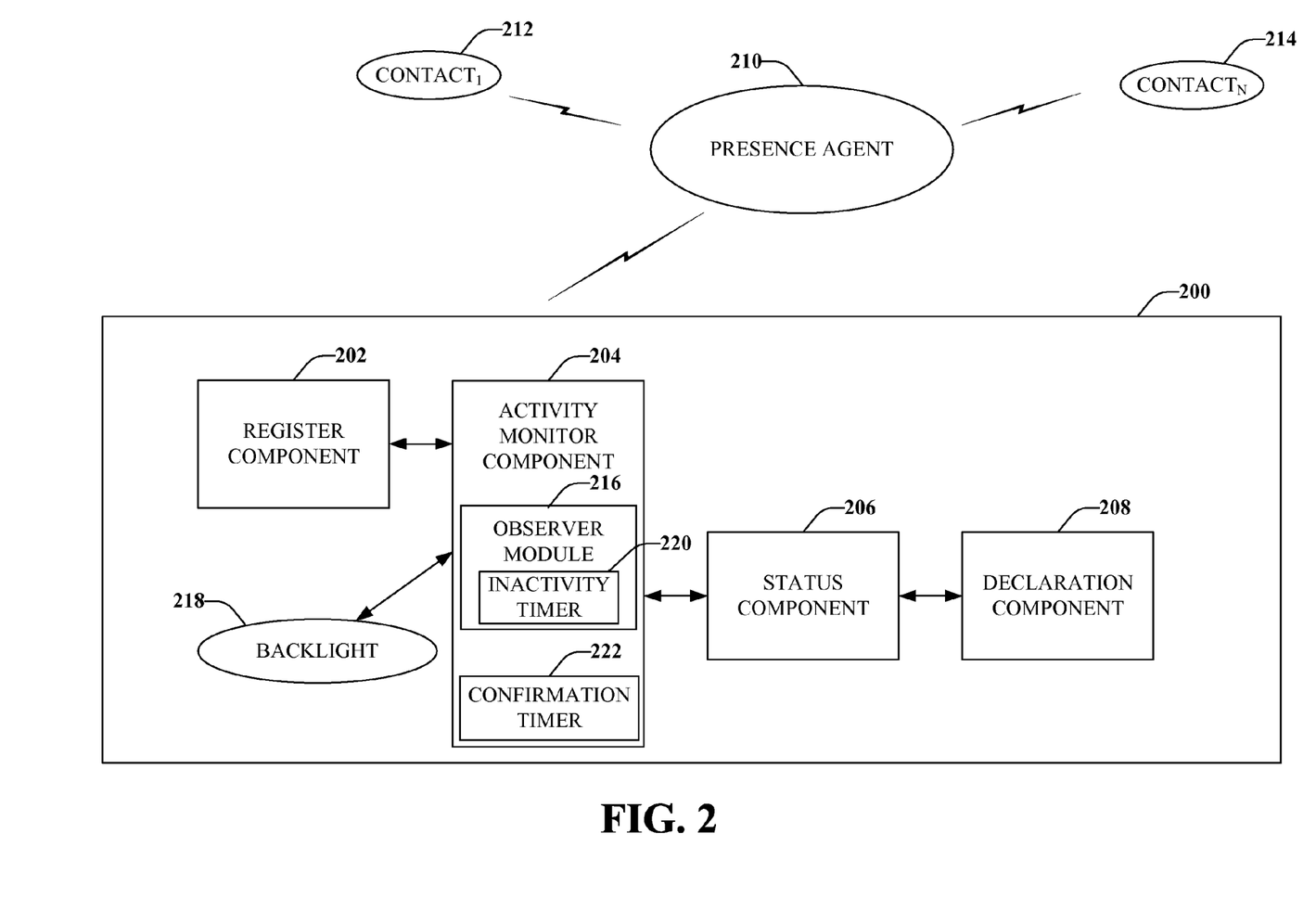
FIG. 2 illustrates a system that can be configured to selectively communicate a user presence and activity with a presence agent.

FIG. 2 illustrates a system 200 that can be configured to selectively communicate a user presence and activity with a presence agent. Such communication can allow a user that is actively using a particular device to receive a real-time communication on the active device, rather than a device that the user is not using or monitoring. System 200 includes a register component 202 that facilitates a user registering the device to receive contact or presence update information. Also included in system 200 is an activity monitor component 204 that can monitor the activity level of the device and make a determination whether the device is being used or is not being used based in part on the monitored activity level. This information can be communicated to a status component 206 that sets the status of the device to correspond with the activity level and a declaration component 208 that declares or communicates information regarding the activity level of the device to an external source.

In further detail, a user registers device, through register component 202, with a presence agent 210, which can be a server that is in wired or wireless communication with device. Such registration can be facilitated through Session Initiation Protocol (SIP), for example, which is a signaling protocol that provides a mechanism for a user's computing device to locate a contact's computing device on a network with which it wants to communicate and to which it wants to establish a session. Presence refers to the availability and activity level of a user on a network (e.g., on-line, Away, busy, and so on). The data relating to the availability and activity level is referred to as "presence information" and can be retrieved by presence agent 210 and returned to the user's computing device where the information may populate a contact or buddy list. Registering with presence agent 210 further includes having the user's presence maintained and to allow various programs on the network to communicate with each other.

The user, wanting to detect the presence of one or more contact (labeled $Contact_1$ 212 and $Contact_N$ 214, where N is an integer greater or equal to one) "subscribes" with the presence agent 210, such as through a SIP SUBSCRIBE message. The presence agent 210 intermediates between the user (sometimes referred to as the watcher) and the one or more contacts 212, 214 to facilitate the communication of the contact's presence information to the user. The ability to detect the presence of the one or more contacts 212, 214 helps in communication and collaboration between the user and the contact. For example, a salesperson might be on-line with a particular device (e.g. desktop computer) at only certain periods during the day. If a colleague (e.g., user) subscribes as a watcher to this salesperson (e.g., contact), the colleague can communicate with the salesperson at different times of the day and communicate in real-time (e.g., chat) regardless of the device (e.g., desktop computer, mobile device) the salesperson is utilizing at any given time.

Activity monitor 204 can include an observer module 216 that can observe a state of a backlight 218 associated with a device display and a confirmation timer 222 that can monitor duration of an active state of a backlight 218. Observer module 216 can be configured to observe the state of the backlight 218, which can be active (on) or not active (off). For example, the device can be configured to set a backlight 218, associated with device to off (not lit) after a pre-determined interval of inactivity, or when the backlight 218 is manually placed in an off condition. The backlight 218 may turn off after a short amount of time (e.g., 30 seconds) to conserve battery life, for example, which can be an operating system setting. Therefore, an inactivity timer 220 can be associated with observer module 216 and can be utilized to track the amount of time the backlight 218 is off before a determination is made that the user is Away and the status of the device should be changed to Away. In such a manner, the user status does not switch to Away too quickly. Observer module 216, detecting that the backlight 218 is off longer than a predetermined amount of time, conveys to status component 206 that the status of the device should be set to Away (e.g., the device is not in use). The status component 206 can set the status of the device to Away based on such information. Thus, the backlight 218 off status is utilized to detect that the user has gone to "Away mode" and such user is declared as Away. If the backlight is re-activated (e.g. turned back on) as detected by observer module 216, the confirmation timer 222 begins to track a predetermined interval of time. After the expiration of the predetermined interval of time, the observer module 216 checks the state of the backlight 218 to determine if it is still is activated (e.g., lit). If it is still activated, the observer module 216 infers the user is active on the device and the device's status should be set to Active and conveys such information to status component 206.

Confirmation timer 218 is configured to prevent false determinations that the device status should be Active rather than Away. For example, the backlight 218 automatically turns on with reception of an incoming call, incoming messages, calendar notifications, and the like. If the user does not answer the call or message, the backlight 218 will turn off after a set interval because there is no activity on the device and, when the set interval expires, the backlight 218 will turn off. Thus, the backlight 218 is checked again after the expiration of the predetermined interval as determined by confirmation timer 222. If the backlight 218 is not on after the expiration of the predetermined interval, the device status does not change (e.g., remains listed as Away).

If the user answers the call or message, the backlight 218 remains lit and the confirmation timer can be overwritten (e.g., the timer does not need to expire) and observer module 216 infers the device is active and currently being used based on such intrinsic evidence. That is to say, that intrinsic evidence can be utilized to determine that the user is active on the device rather than waiting for the expiration of a confirmation timer 222. Intrinsic evidence can include activities that are initiated by the user as evidence that the user is Online. Upon the detection of such intrinsic evidence, the device status is changed from Away to Active and the timer is stopped (e.g., does not need to time-out). Thus, activity status monitor 204 can detect a screen state transition (e.g., Screen Backlight On, Screen Backlight Off) and upon the expiration of confirmation timer or based on extrinsic information determine if the user is active on the device (e.g., Online) or not active on the device (e.g., Away) and such information can be communicated to status component 206. In such a manner, communication intended for a user of multiple devices can be sent to the device that the user is current using, thus mitigating missed communications.

Figure 3:
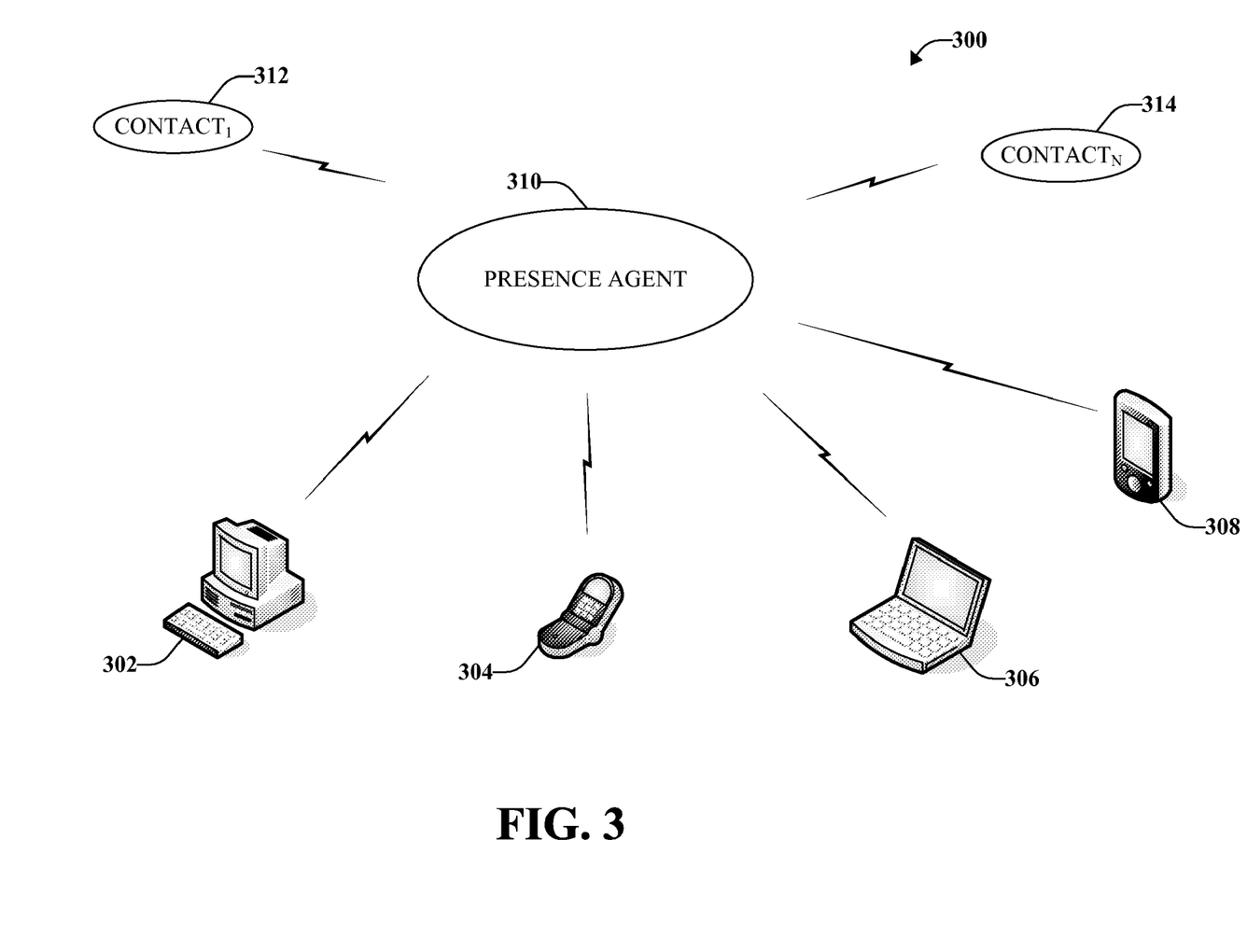
FIG. 3 illustrates a communication system with a user having multiple points of presence in accordance with the one or more embodiments presented herein.

FIG. 3 illustrates a communication system 300 with a user having multiple points of presence in accordance with the one or more embodiments presented herein. A user can employ one or more wired and/or wireless devices, such as a desktop computer 302, a cellular phone 304, a laptop computer 306, and a PDA 308. These devices can be referred to as endpoints. It should be understood that the devices 302-308 are shown for example purposes. A user can be associated with more or fewer device than those shown. In addition, a user can be associated with different communication devices than those illustrated.

A user may utilize a particular device 302-308 depending on the location of the user. For example, the desktop 302 can be utilized while at work and the PDA 308 can be utilized while in an automobile. A particular device may also be utilized based on a user preference, based on information maintained by the device, a function to be performed, or based on other criteria.

Each device 302-308 can be registered with a presence agent 310 to allow the user to communicate with one or more contacts, labeled Contact$_1$ 312 through Contact$_N$ 314, where N is an integer equal to or greater than one. For efficient communication, the presence agent 310 should route the communication between the one or more contacts 312, 314 and the user through the user's most active end-point or device 302-308. Thus, if a user is no longer currently using a particular device (e.g., cellular phone 304), the communication can be routed through the device the user is active on (e.g., laptop computer 306). The communication can be routed by presence agent 310 in a seamless manner such that communication is routed efficiently.

Figure 4:
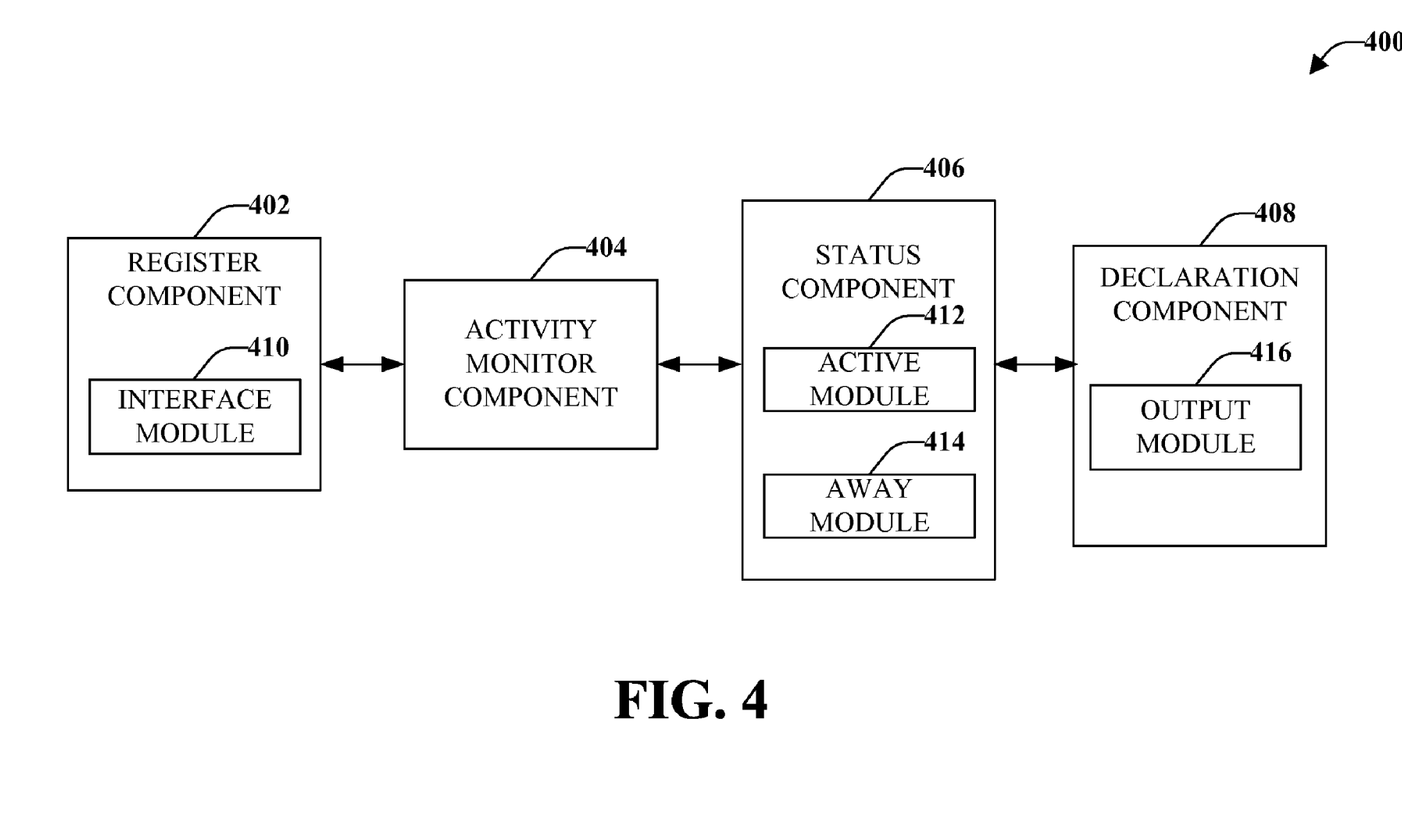
FIG. 4 illustrates a system for determining if a user is actively using a device.

FIG. 4 illustrates a system 400 for determining if a user is using a device. System 400 can be implemented on various user devices to allow a user to register (thorough interaction with a register component 402) with a presence server or agent in order to monitor the presence of various contacts and to communicate with such contacts. An activity monitor component 404 can monitor an activity level of a device and communicate the activity level information to status component 406 that can set the status of the device to "Active" or "Away". If the status is set to "Away" a user is not using the device and incoming communications are mitigated. Declaration component 408 can obtain the status of the device and selectively declare to the presence agent or server that the device status as "Active" or "Away" to facilitate a contact communicating with user though the device when the status is "Active" and mitigating communication with user through the device when the status is "Away".

Register component 402, can be associated with an interface module 410 that can provide the user a means to register the device, add contact information (e.g., email alias, and the like), communicate with the one or more contacts, manually revoke device registration for the one or more contacts, and the like. In addition or alternatively, the device registration can be autonomously deactivated and/or activated by system 400 for one or more contacts depending on whether activity monitor component 404 determines the status of the device is Active (activated) or Away (deactivated). Such autonomous activation/deactivation can be facilitated by declaration component 408.

Status module 406 can include an Active module 412 and an Away module 414 that can be configured to place the device in appropriate status. The status can be communicated, through respective Active and Away modules 412, 414 to declaration component 408. An output module 416 can be associated with declaration component 408 that can selectively transmit the status information to the presence agent(s) or server(s).

As discussed herein, the register components and/or interface modules can provide various types of user interfaces. Such as, for example, a graphical user interface (GUI), a command line interface, a speech interface, Natural Language text interface, and the like. For example, a GUI can be rendered that provides a user with a region or means to load, import, select, read, etc. one or more contact information and whether such contact should be monitored (e.g., presence information sent to user), and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. For example, the user can interact with the one or more contacts by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 5:
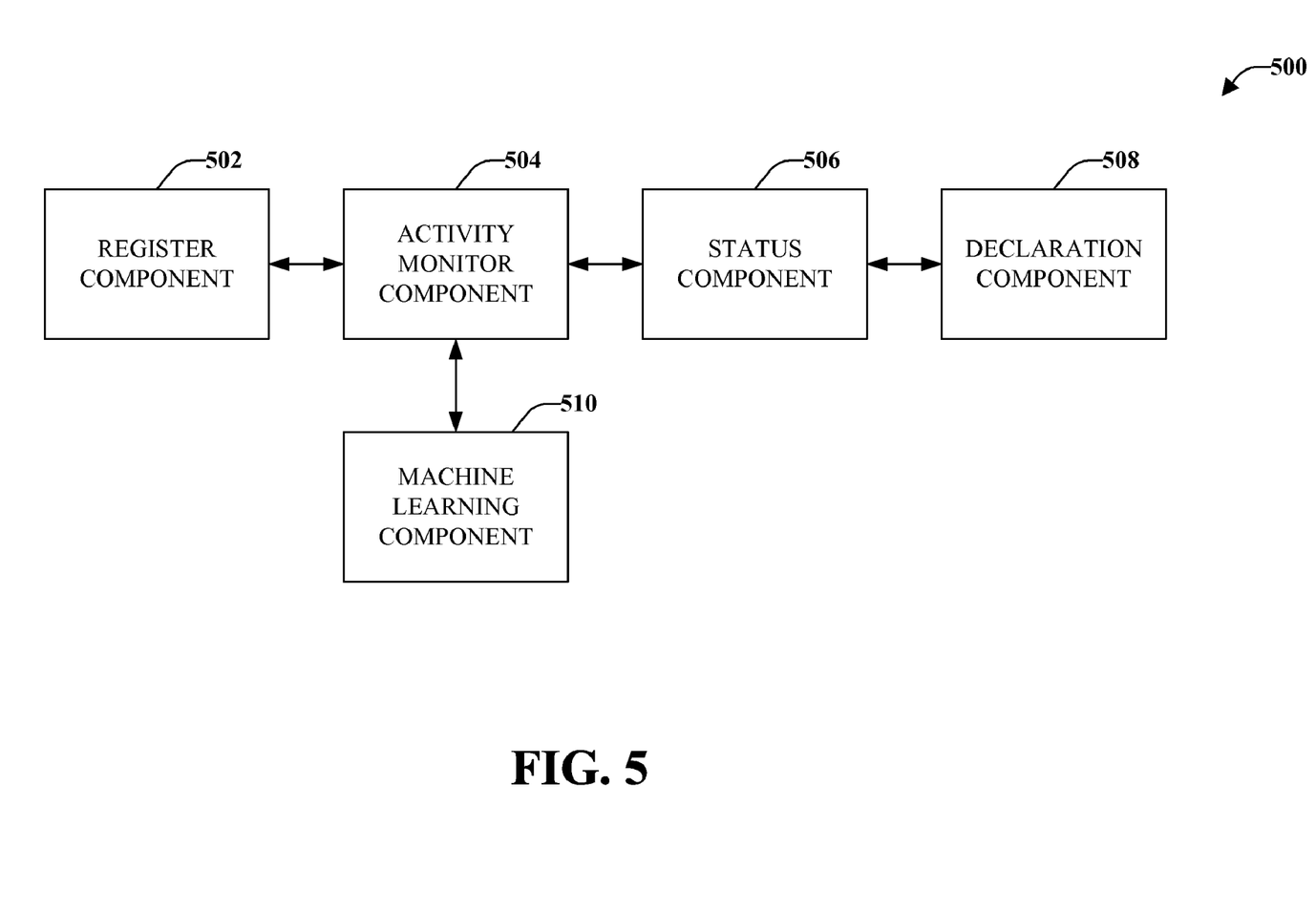
FIG. 5 illustrates a system for determining status of a device and selectively setting the status as "Active" or "Away" utilizing a machine learning component.

FIG. 5 illustrates a system 500 that includes a register component 500, an activity monitor component 504, a machine learning component 510, a status component 506 and a declaration component 508. The activity monitor component 504 is communicatively coupled to the machine learning component 510, the register component 520 and the status component 506 while the status component 506 is communicatively coupled to the declaration component 508. The system 500 can be configured for determining status of a device and selectively setting the status as "Active" or "Away" utilizing the machine learning component 510. The machine learning component 510 can employ artificial intelligence based schemes, rules-based logic schemes, or other schemes.

Artificial intelligence based systems (e.g. explicitly and/or implicitly trained classifiers) can be employed in connection with performing inference and/or probabilistic determinations and/or statistical-based determinations as in accordance with one or more described embodiments. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

For example, a process for determining if a user is utilizing a device and should receive contact presence information at such device can be facilitated through an automatic classifier system and process. A classifier is a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. In the case of device status information, for example, attributes can be device information or other data-specific attributes derived from the known device information (e.g., backlight turns off after xx seconds of inactivity on the device), and the classes are categories or areas of interest (e.g., backlight activates when there is an incoming call and deactivates after for xx seconds if the call is not answered).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g. naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g. through a generic training data) as well as implicitly trained (e.g., by observing user behavior, receiving extrinsic information). For example, SVM's are configured through a learning or a training phase within a classifier constructor and feature selection module. Thus, the classifier(s) can be used to automatically learn and perform a number of functions, including but not limited to determining according to a predetermined criteria when to set the status to "Active" or "Away", etc. The criteria can include, but is not limited to, whether a backlight is active, whether a user is initiating an outgoing communication, whether a user has accepted an incoming communication, etc.

In some embodiments, machine learning component 510 employs a rules-based logic scheme. In accordance with this alternate aspect, an implementation scheme (e.g., rule) can be applied to control and/or regulate activation (e.g., on-line) and/or deactivation ("Away") of presence information for one or more contacts. It will be appreciated that the rules-based implementation can automatically and/or dynamically render device "Active" or "Away" based upon a predefined criterion. In response thereto, the rule-based implementation can activate and/or deactivate a subscription for the device to presence information by employing a predefined and/or programmed rule(s) based upon any desired criteria (e.g. backlight state, communication status, and the like).

For example, a user can establish a rule that can require a backlight to be off for longer than a predetermined interval (e.g. expecting information from a particular contact and want to receive the information on a particular device even if not currently active on the device) to receive presence information for a particular contact whereas, other contact information may not be received at the particular device (e.g., information not important) after expiration of the predetermined interval. It is to be appreciated that any preference can be effected through pre-defined or pre-programmed in the form of a rule. It is to be appreciated that the rules-based logic described can be employed in addition to or in place of the Artificial Intelligence-based logic.

Figure 6:
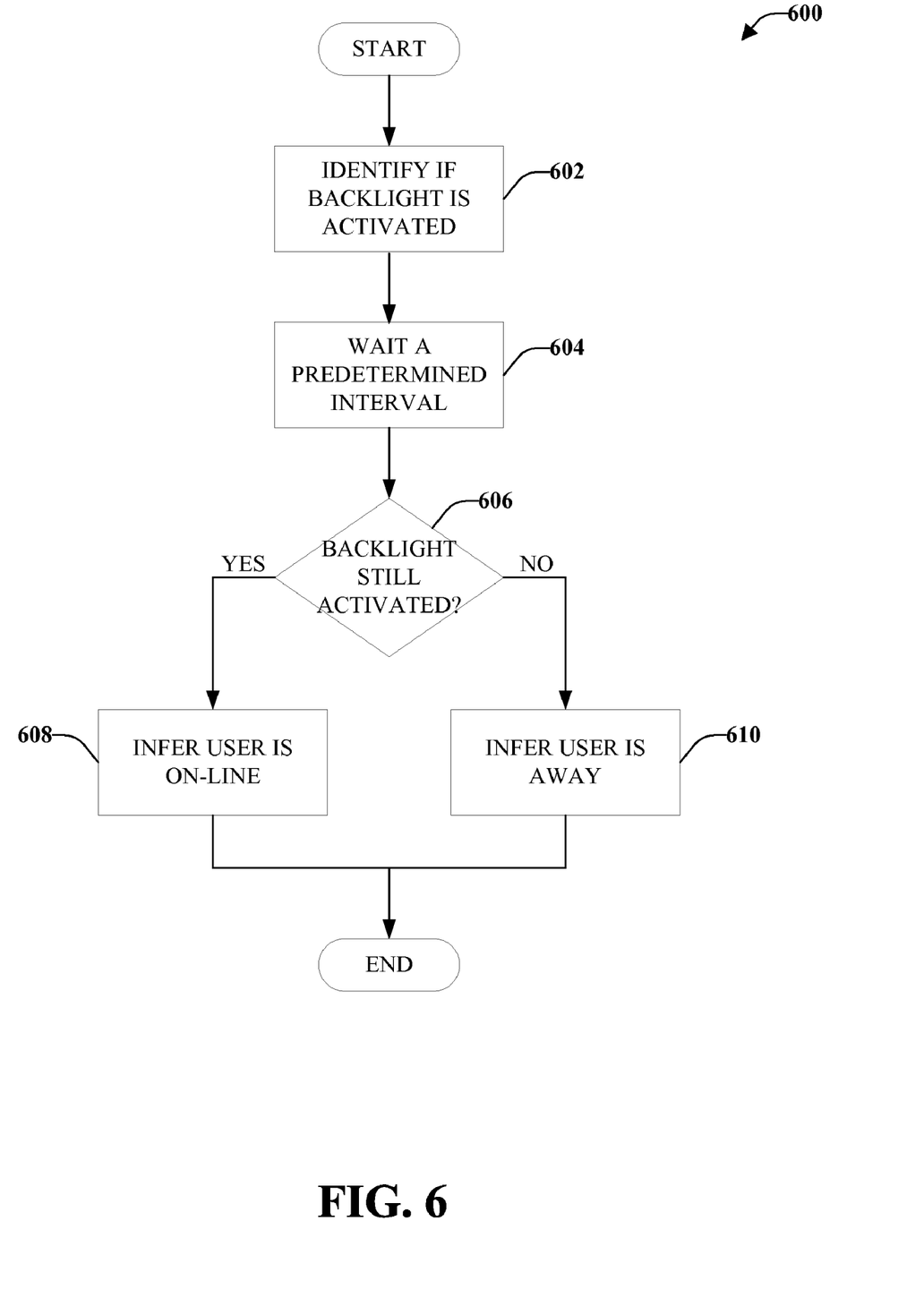
FIG. 6 illustrates a methodology for detecting activity on a device.
Figure 7:
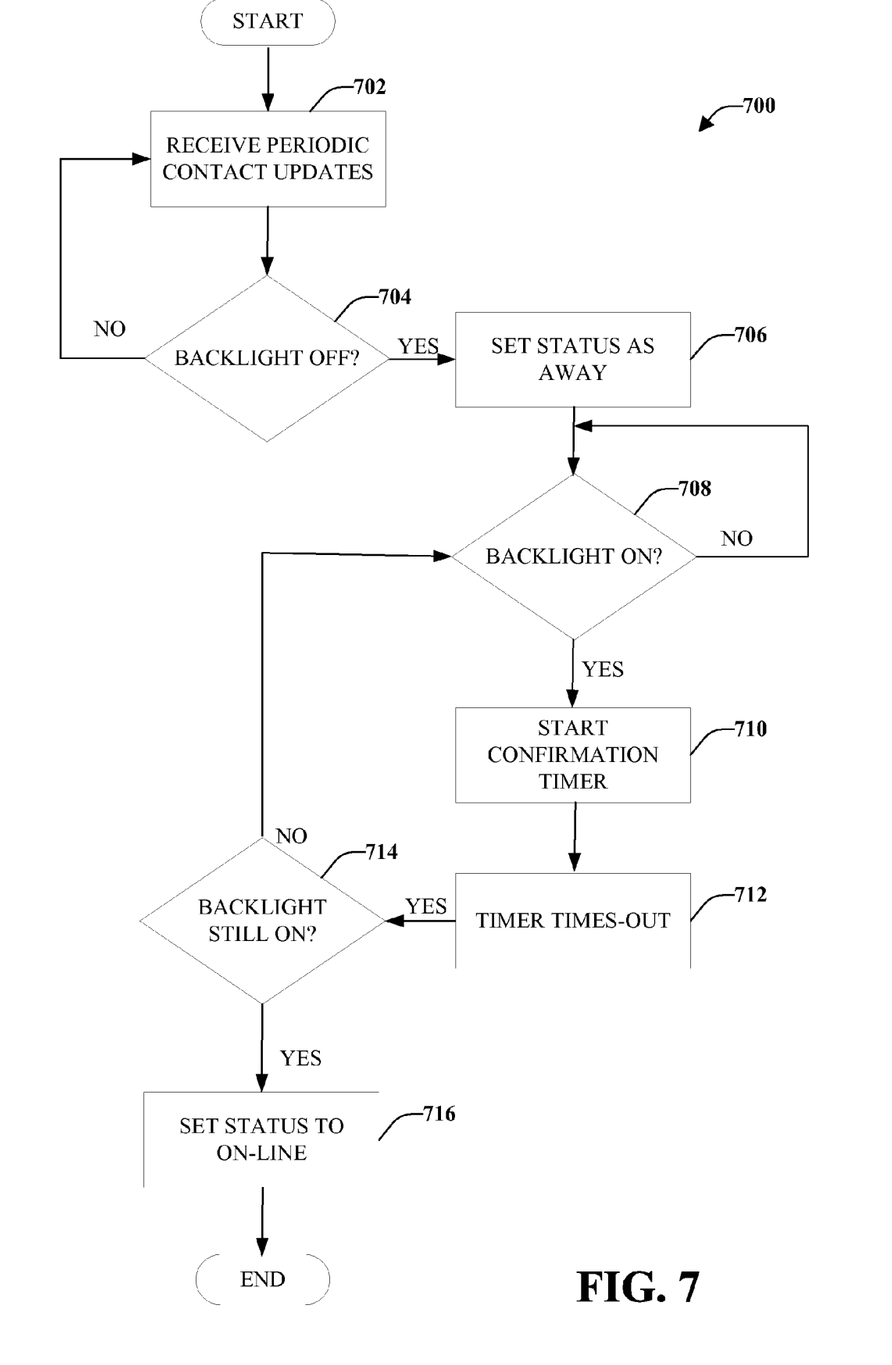
FIG. 7 illustrates a methodology for determining whether a user of a device is "Online" or "Away" for real-time communication activities.

In view of the exemplary systems shown and described above, methodologies that may be implemented in accordance with the disclosed subject matter, will be better appreciated with reference to the flow charts of FIGS. 6 and 7. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference now to FIG. 6, illustrated is a methodology 600 for detecting activity on a device. Method 600 starts, at 602, where activation of a backlight is identified. The backlight can be activated (e.g., lit) if a user is using the device. If the device is in the "Away" state and it is now identified that the backlight is active, method 600 waits a predetermined interval or confirmation interval, at 604. This predetermined interval can be an interval longer than an interval during which an incoming communication is received at the device. That is to say, the confirmation timer should be longer than the time a backlight might be lit due to an incoming call that is not answered. The backlight will turn off after a set time if the call is not answered and will remain active if the call is answered.

At 606, a determination is made whether the backlight is still activated. For example, an incoming communication can be received at device. If the incoming communication is not accepted (e.g., answered), the backlight can be active while the call is attempted to be communicated to the user. If the user accepts the communication ("YES") method 600 continues, at 608, where it can be inferred that the user is Online and the status of the device is set to "Active". In some embodiments, if intrinsic evidence indicating the user is active on the device, the status of the device can be set to Active without waiting for the expiration of the confirmation timer. If the user does not accept the incoming communication, the backlight will be active only during the period of time the communication is attempting to alert the user (after which an incoming communication is sent to voice mail, for example). Method 600 can infer, at 610, that the user is not using the device and the device status can be set to or maintained as "Away", thus, mitigating updates being set to the device, which will not be received by user.

FIG. 7 illustrates a methodology 700 for determining whether a user is Online or Away for real-time communication activities. Method 700 begins, at 702, where periodic status updates (e.g., on-line, off-line, busy, and so on) of a one or more contacts are received to facilitate communication between user and contact(s). These status updates can be received from a presence agent or service to which the user device is registered. A registration request can include one or more contacts and contact information (e.g., contact alias information). Periodic presence updates are received, at 702, which inform a user of the status of the one or more contacts.

At 704, a determination is made whether a backlight of the device is "OFF" (e.g., user is not using the device), the backlight can initially turn off after a short amount of time (e.g., 45 seconds) to conserve system resources, therefore, an additional period of time should expire before a determination is made that the user is not using the device. If the backlight is "ON" ("YES") the user is using the device (e.g., device status is Active) and periodic updates continue to be received, at 702. If the backlight is "OFF" ("NO") for longer than a predetermined amount of time, the device status is set to "Away" status at 706.

Method 700 continues, at 708, where a determination is made whether the backlight is "ON" (e.g., the user has resumed using the device). If the backlight is still off ("NO"), the user has not resumed activity on the device and the device status remains as "AWAY" until the backlight is activated. If the determination, at 708, is that the backlight is "ON" ("YES"), a confirmation timer is started, at 710. The time interval of confirmation timer can be set autonomously by device or it can be manually set by the user.

At 712, the confirmation timer times out (e.g., the predetermined interval has expired) and method 700 continues, at 714, where a determination is made whether the backlight is still on. If the backlight is not on ("NO"), the device status remains as "AWAY" and method 700 continues, at 708, until the backlight is on. If the determination, at 714, is that the backlight is still on ("YES"), the device status is set to "Active", at 716. Such status information can be sent or declared to presence agent and communication can be received at device that infers a high probability that the user is actively using the device.

In some embodiments, various activities on device can override the confirmation timer. For example, if the device status is "Away" and a user answers an incoming message (e.g., telephone call, text message, and the like), the device status is set to "Active" since the confidence level that the user is active on the device is high. The device status can also be automatically set to "Active" without requiring the confirmation timer to time out (e.g., the timer is stopped or killed) when the user initiates a communication or performs another user-initiated function on device.

Figure 8:
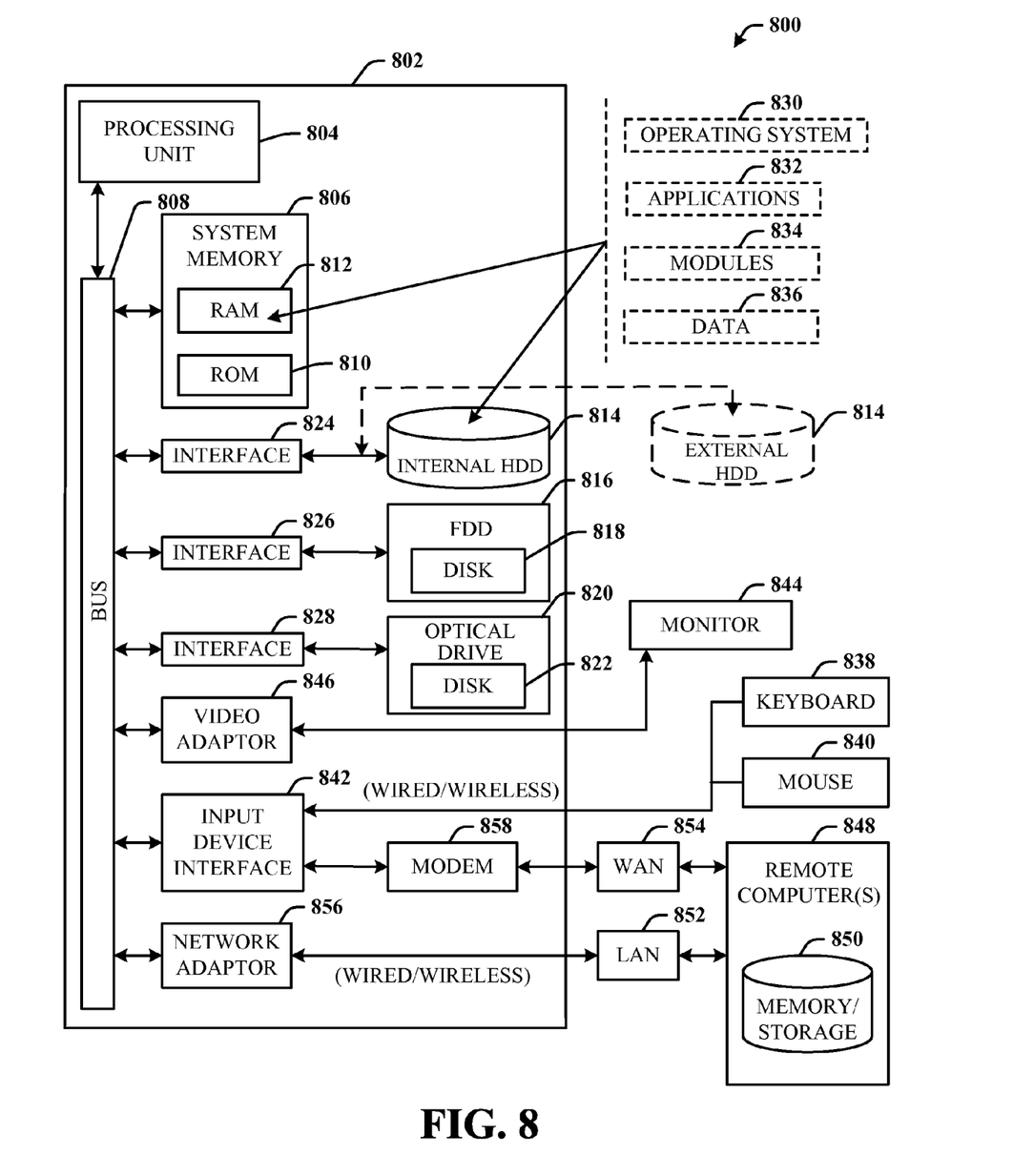
FIG. 8 illustrates a block diagram of a computer operable to execute the disclosed embodiments.

Referring now to FIG. 8, there is illustrated a block diagram of a computer operable to execute the disclosed architecture. In order to provide additional context for various aspects disclosed herein, FIG. 8 and the following discussion are intended to provide a brief, general description of a suitable computing environment 800 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g. EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various embodiments can be implemented with various commercially available operating systems or combinations of operating systems.

A user can enter commands and information into the computer 802 through one or more wired/wireless input devices, e.g. a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus

808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g. a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or network adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
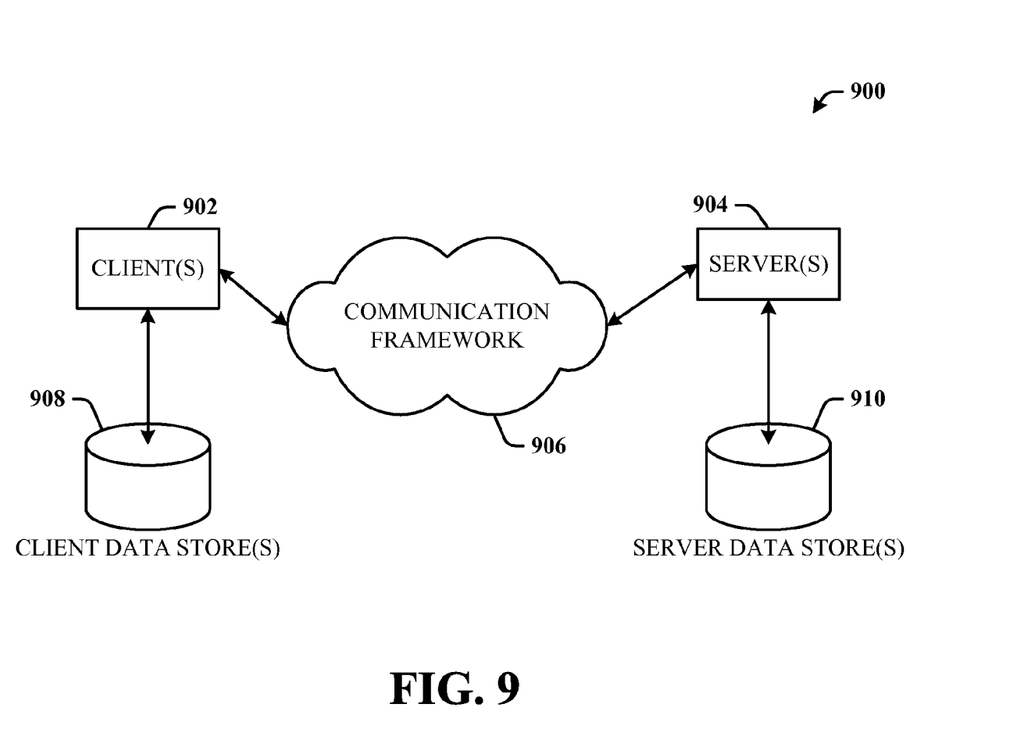
FIG. 9 illustrates a schematic block diagram of an exemplary computing environment operable to execute the disclosed embodiments.

Referring now to FIG. 9, there is illustrated a schematic block diagram of an exemplary computing environment 900 in accordance with the various embodiments. The system 900 includes one or more client(s) 902. The client(s) 902 can be hardware and/or software (e.g., threads, processes, computing devices). The client(s) 902 can house cookie(s) and/or associated contextual information by employing the various embodiments, for example.

The system 900 also includes one or more server(s) 904. The server(s) 904 can also be hardware and/or software (e.g., threads, processes, computing devices). The servers 904 can house threads to perform transformations by employing the various embodiments, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for monitoring activity of a device, the system comprising:
    a processor;
    a register component configured to register the device with a presence agent and allow real-time communication with at least one contact;
    an activity monitor component configured to monitor a backlight of the device;
    a status component configured to receive information indicative of the backlight and set a status of the device to at least one of Active in response to the information indicative of the backlight indicating the backlight is lit or to Away in response to the information indicative of the backlight indicating the backlight is unlit;
    a declaration component configured to declare the status of the device to the presence agent;
    a confirmation timer configured to track a selected interval, wherein the selected interval commences when the backlight changes from being lit to being unlit, wherein the status component is further configured to set the status of the device to Active when the information indicative of the backlight indicating the backlight is lit indicates the backlight is lit for longer than the selected interval; and
    a computer-readable storage medium storing instructions that, when executed by the processor, cause the processor to implement at least one of the register component, the activity monitor component, the status component, the declaration component or the confirmation timer.

2. The system of claim 1, wherein the information indicative of the backlight includes a state of the backlight of the device and indicates the device is in use when the backlight is lit and indicates that the device is not in use when the backlight is unlit.

3. The system of claim 1, wherein the status component is further configured to override the confirmation timer and automatically set the status of the device to Active based on intrinsic evidence that is received.

4. The system of claim 1, wherein the backlight is unlit when the device is not illuminated with the backlight.

5. The system of claim 1, wherein the status component is further configured to set the status of the device to Away based on a manual instruction.

6. The system of claim 1, further comprising a machine learning component configured to automatically change the status of the device from Away to Active and from Active to Away.

7. The system of claim 6, wherein the machine learning component is configured to employ at least one of an artificial-intelligence based scheme or a rules-based logic scheme.

8. A method comprising:
    executing on a processor, computer-executable instructions that, when executed, cause the processor to:
        identify that a backlight of a device has changed from being illuminated to being non-illuminated;
        commence a timer upon the identifying that the backlight has changed from being illuminated to being non-illuminated;
        determine whether the backlight is still non-illuminated after expiration of the timer; and
        infer that a status of the device is inactive, in response to determining that the backlight is still non-illuminated after the expiration of the timer.

9. The method of claim 8, wherein the computer-executable instructions, when executed, further cause the processor to:
    detect intrinsic evidence indicative of a user of the device being online; and
    infer that the status of the device has an active status based solely upon a detected intrinsic evidence of the user of the device being online.

10. The method of claim 8, wherein the computer-executable instructions, when executed, further cause the processor to infer that the status of the device is an active status, in response to determining that the backlight is illuminated after the expiration of the timer.

11. The method of claim 8, wherein the computer-executable instructions, when executed, further cause the processor to communicate the inferred status of the device to a presence agent.

12. The method of claim 8, wherein the computer-executable instructions, when executed, further cause the processor to, prior to determining that the backlight is illuminated, declare the status of the device as inactive.

13. The method of claim 8, wherein the computer-executable instructions, when executed, further cause the processor declare to a presence agent, the status of the device as inactive after inferring that the status is inactive.

14. A computer-readable storage medium storing computer-executable instructions that, when executed on a processor, cause the processor to:
    identify that a backlight of a device has changed from being illuminated to being non-illuminated;
    start a timer upon the identifying that the backlight has changed from being illuminated to being non-illuminated;
    determine a device status based on whether the backlight of the device is illuminated or is non-illuminated after expiration of the timer;
    set the device status to an active status upon processing information indicative of the backlight being illuminated after the expiration of the timer; and
    automatically communicate the device status to a presence agent.

15. The computer-readable storage medium of claim 14, further storing computer-executable instructions that, when executed on a processor, further cause the processor to:
    set the device status to an inactive status upon processing information indicative of the backlight being non-illuminated after the expiration of the timer.

16. The computer-readable storage medium of claim 14, further storing computer-executable instructions that, when executed on a processor, further cause the processor to:
    evaluate intrinsic evidence; and
    automatically change the device status based, in part, on an evaluated intrinsic evidence.

* * * * *

UNITED STATES PATENT AND TRADEMARK OFFICE
CERTIFICATE OF CORRECTION

| | | |
|---|---|---|
| PATENT NO. | : 7,711,815 B2 | |
| APPLICATION NO. | : 11/548143 | |
| DATED | : May 4, 2010 | |
| INVENTOR(S) | : Neeraj K. Garg et al. | |

It is certified that error appears in the above-identified patent and that said Letters Patent is hereby corrected as shown below:

In column 3, line 52, delete "to"Active"" and insert -- to "Active" --, therefor.

In column 4, line 19, delete "status monitor" and insert -- monitor component --, therefor.

In column 4, line 21, delete "status monitor" and insert -- monitor component --, therefor.

In column 5, line 14, after "monitor" insert -- component --.

In column 5, line 20, delete "218," and insert -- 218 --, therefor.

In column 5, line 38, after "backlight" insert -- 218 --.

In column 5, line 48, delete "218" and insert -- 222 --, therefor.

In column 6, line 5, delete "status monitor" and insert -- monitor component --, therefor.

In column 7, line 8, delete "Status module" and insert -- Status component --, therefor.

In column 10, line 57, after "set to" insert -- On-line or --.

In column 13, line 29, after "The" insert -- network --.

In column 13, lines 31-32, after "communicating" delete "with the wireless" and insert -- wirelessly with the network --, therefor.

Signed and Sealed this
Twenty-fourth Day of May, 2011

David J. Kappos
*Director of the United States Patent and Trademark Office*